(12) United States Patent
Raimann

(10) Patent No.: US 10,673,341 B2
(45) Date of Patent: Jun. 2, 2020

(54) COMBINED TRANSFORMER AND LLC RESONANT CONVERTER

(71) Applicant: Bayerische Motoren Werke Aktiengesellschaft, Munich (DE)

(72) Inventor: Manuel Raimann, Ueberlingen (DE)

(73) Assignee: Bayerische Motoren Werke Aktiengesellscaft, Munich (DE)

( * ) Notice: Subject to any disclaimer, the term of this patent is extended or adjusted under 35 U.S.C. 154(b) by 0 days.

(21) Appl. No.: 16/110,913

(22) Filed: Aug. 23, 2018

(65) Prior Publication Data

US 2018/0366267 A1 Dec. 20, 2018

Related U.S. Application Data

(63) Continuation of application No. PCT/EP2017/051462, filed on Jan. 25, 2017.

(30) Foreign Application Priority Data

Feb. 24, 2016 (DE) .................. 10 2016 202 797

(51) Int. Cl.
*H02M 3/335* (2006.01)
*H01F 30/10* (2006.01)
(Continued)

(52) U.S. Cl.
CPC ........ *H02M 3/33569* (2013.01); *H01F 27/28* (2013.01); *H01F 27/38* (2013.01);
(Continued)

(58) Field of Classification Search
CPC .......... H01F 27/38; H01F 27/28; H01F 37/00; H01F 27/40; H01F 30/10; H02M 3/33569;
(Continued)

(56) References Cited

U.S. PATENT DOCUMENTS 5,783,984 A * 7/1998 Keuneke .................. H03H 7/38
336/155
6,040,986 A * 3/2000 Sakamoto ............... H01F 38/14
363/21.02

(Continued)

FOREIGN PATENT DOCUMENTS

| CN | 101308724 A | 11/2008 |
| DE | 195 42 357 A1 | 4/1997 |

(Continued)

OTHER PUBLICATIONS

PCT/EP2017/051462, International Search Report dated Apr. 25, 2017 (Three (3) pages).

(Continued)

*Primary Examiner* — Alex Torres-Rivera
(74) *Attorney, Agent, or Firm* — Crowell & Moring LLP

(57) ABSTRACT

The invention relates to a combined transformer for an LLC resonant converter. The combined transformer includes a primary transformer winding configured to generate during operation a first magnetic flux, which forms a first magnetic circuit. The combined transformer also includes a resonant inductor having a winding, wherein the resonant inductor is configured to generate during operation a second magnetic flux, which forms a second magnetic circuit. The primary transformer winding and the winding of the resonant inductor are arranged with respect to one another such that at least one first part of the first magnetic circuit and at least one second part of the second magnetic circuit run on a magnetic path common to the first part and to the second part. The invention also relates to an LLC resonant converter with such a combined transformer.

16 Claims, 4 Drawing Sheets

(51) Int. Cl.
*H01F 27/40* (2006.01)
*H01F 37/00* (2006.01)
*H02M 1/42* (2007.01)
*H01F 27/38* (2006.01)
*H01F 27/28* (2006.01)
*H02M 3/337* (2006.01)

(52) U.S. Cl.
CPC ............. *H01F 27/40* (2013.01); *H01F 30/10* (2013.01); *H01F 37/00* (2013.01); *H02M 1/4241* (2013.01); *H02M 3/337* (2013.01); *Y02B 70/1433* (2013.01)

(58) Field of Classification Search
CPC .. H02M 3/337; H02M 1/4241; Y02B 70/1433
USPC ............................................ 363/21.02, 21.03
See application file for complete search history.

(56) References Cited

U.S. PATENT DOCUMENTS

| | | | |
|---|---|---|---|
| 8,502,634 | B2 | 8/2013 | Gruber et al. |
| 2008/0224809 | A1 | 9/2008 | Zhang et al. |
| 2009/0147541 | A1* | 6/2009 | Shimada ................ H01F 27/38 363/15 |
| 2013/0343091 | A1* | 12/2013 | Njiende T. .............. H01F 30/06 363/16 |
| 2015/0303792 | A1 | 10/2015 | Kim |
| 2017/0054378 | A1* | 2/2017 | Njiende T. .......... H01F 27/2823 |
| 2018/0350513 | A1* | 12/2018 | Murakami ................ H01F 3/14 |

FOREIGN PATENT DOCUMENTS

| | | |
|---|---|---|
| DE | 100 59 644 A1 | 6/2002 |
| DE | 10 2012 108 082 A1 | 3/2013 |
| EP | 0 406 555 A1 | 1/1991 |
| EP | 2 262 088 A1 | 12/2010 |

OTHER PUBLICATIONS

Bo Yang et al., "Integrated magnetic for LLC resonant converter", APEC 2002. 17th. Annual IEEE Applied Power Electronics Conference and Exposition. Dallas, TX, Mar. 10-14, 2002; [Annual Applied Power Electronics Conference], New York, NY : IEEE, US, vol. Conf. 17, Mar. 10, 2002, XP010582943, Eight (8) total pages.
Chinese Office Action issued in Chines application No. 201780005208.4 dated Mar. 23, 2020, with English translation (Seventeen (17) pages).

* cited by examiner

COMBINED TRANSFORMER AND LLC RESONANT CONVERTER

CROSS REFERENCE TO RELATED APPLICATIONS

This application is a continuation of PCT International Application No. PCT/EP2017/051462, filed Jan. 25, 2017, which claims priority under 35 U.S.C. § 119 from German Patent Application No. 10 2016 202 797.2, filed Feb. 24, 2016, the entire disclosures of which are herein expressly incorporated by reference.

BACKGROUND AND SUMMARY OF THE INVENTION

The invention relates to a combined transformer for an LLC resonant converter and to an LLC resonant converter having such a transformer, where LLC refers to a configuration with two inductors (LL) and a capacitor (C).

In on-board charging devices, so-called galvanically isolated DC/DC converters are often used for reasons of efficiency. The galvanic isolation is required here for reasons of safety. The galvanically isolated energy transmission can be achieved by using a transformer. A conventional topology for such a resonant galvanically isolated DC/DC converter is the so-called LLC topology, which is distinguished by a resonant network consisting of a series resonant inductor, a parallel resonant inductor and a resonant capacitor. The parallel resonant inductor is usually realized by the main inductance of the transformer and therefore does not constitute an additional component part. As a result, it is possible for switching transistors to be able to be used for switching over the entire load range under zero voltage (so-called zero-voltage switching), as a result of which energy-efficient operation with high efficiencies can be achieved. Resonant converters of this kind also have a high power density.

Beyond these achievements, a further reduction of the necessary installation space is desirable.

The present invention is therefore based on the object of reducing the installation space of an LLC resonant converter. Furthermore, the invention is intended to be used to reduce the costs of producing the LLC resonant converter and the weight thereof as well as to improve the simplicity in terms of the design thereof.

According to the invention, the above object is achieved by the features of the independent claim. Advantageous embodiments are described in the dependent claims.

The combined transformer according to the invention for an LLC resonant converter comprises a primary transformer winding, which is configured to generate during operation a first magnetic flux, for example in the transformer core, which first magnetic flux forms a first magnetic circuit, and a resonant inductor having a winding, which resonant inductor is configured to generate during operation a second magnetic flux, which forms a second magnetic circuit. The primary transformer winding and the winding of the resonant inductor are arranged with respect to one another in such a way that at least one first part of the first magnetic circuit and at least one second part of the second magnetic circuit run on a magnetic path common to the first part and to the second part.

A transformer comprises a primary and a secondary winding on a common core. The combined transformer according to the invention comprises the winding of the resonant inductor, which can be integrated in a single component together with the transformer core and the transformer windings. The primary transformer winding and the winding of the resonant inductor can be wound onto a common core, for example the transformer core in the form of a three-limbed core, or on cores adjoining one another that are different from one another. The primary transformer winding is coupled to the winding of the resonant inductor. The primary-side transformer winding and the winding of the resonant inductor form in each case a magnetic circuit, wherein the magnetic circuits of the primary-side transformer winding and the winding of the resonant inductor run at least partly on a magnetic path common to the two circuits or the primary-side winding and the resonant inductor have at least one section of their respective circuit in common.

The transformer winding generates a magnetic circuit, the so-called transformer circuit. The winding of the resonant inductor generates a further magnetic circuit, the so-called resonant circuit. There is now provision according to the invention for the resonant circuit and the transformer circuit to share at least a part of their magnetic circuits. This sharing can be seen in spatial terms, that is to say it takes place at the same location. The common part of the magnetic circuits, which are generated by the transformer winding and the winding of the resonant inductor, also referred to as common section, is the common magnetic path. Together with the secondary winding of the transformer, according to the invention there is thus a transformer combined or coupled with a resonant inductor present as an integrated component.

In the following text, the transformer is always understood as the physical transformer, wherein the addition of "ideal" specifically refers to the ideal transformer.

According to the invention, a combined transformer, and, in one embodiment, a combined LLC transformer, are proposed. The design of the combined transformer is distinguished by a combined arrangement of the magnetic resonant component parts and the transformer. The inventive integration of the magnetic resonant component parts can achieve the savings to be achieved according to the object of the present invention in the area of number of component parts, installation space, costs and weight. The combined LLC transformer can also be realized without extra component parts. For example, no further components are necessary for the design of the combined transformer in comparison with an LLC resonant converter with transformer and resonant inductor separate therefrom.

In one embodiment of the combined transformer according to the invention, the primary transformer winding and the winding of the resonant inductor are arranged with respect to one another in such a way that the first magnetic flux of the first magnetic circuit and the second magnetic flux of the second magnetic circuit are at least partly destructively superposed on the magnetic path common to the first part and to the second part. The resonant component parts in the form of the resonant inductor having a resonant inductance value and the transformer having a magnetizing inductance value are thus arranged or interconnected in such a way that the magnetic fluxes of the magnetic circuits are completely or partly destructively superposed on the common magnetic path.

The destructive superposition of the magnetic fluxes, that is to say the at least partial subtraction thereof, causes the material or medium that penetrates the magnetic flux to have a lower overall flux density in this part of the common magnetic path than without the destructive superposition. In this way, the required magnetic cross section at the location of the common path can be reduced in comparison with a non-destructive superposition given identical magnetic fluxes. The flux resulting from the two magnetic fluxes is smaller than the respective magnetic fluxes (individual fluxes) separately. More precisely, the destructive superposition causes the magnitude of the resulting flux to be smaller than the magnitude of the larger flux of the two magnetic fluxes guided on the common path.

In a further embodiment of the combined transformer according to the invention, the destructive superposition is caused by an arrangement, winding direction and/or interconnection of the primary transformer winding and the resonant inductor.

The arrangement denotes the position or positioning of the resonant inductor and the primary transformer winding with respect to one another. If the resonant inductor and the primary transformer winding are placed on a core, they can be located on respectively one of a plurality of possible limbs of a core. The core type is in turn selected from a plurality of possible types of core. The winding direction of the resonant inductor and the primary transformer winding determines the respective direction of the magnetic flux. Depending on the arrangement and interconnection, the resonant inductor and the primary transformer winding are wound in the opposite direction or in the same direction. The interconnection of the resonant inductor and the primary transformer winding influences the temporal sequence and direction in which current flows through the resonant inductor and the primary transformer winding. The temporal sequence and direction in which current flows through the resonant inductor and the primary transformer winding determines (in addition to the arrangement and the winding direction) when and in which direction the magnetic fluxes are generated.

One possible interconnection can be effected by a simple, where appropriate direct, electrical connection without intermediate elements respectively of a terminal of the resonant inductor and the primary transformer winding with one another. In this series circuit of the resonant inductor and the primary transformer winding, the same current flows through the resonant inductor and the primary transformer winding. This ensures that in each case a magnetic flux is generated at the same time in the resonant inductor and the primary transformer winding so that said respective magnetic fluxes can be superposed in the same magnetic path (at any time).

The combination of the arrangement of the resonant inductor and the primary transformer winding, winding direction and/or interconnection takes place according to the invention in such a way that the magnetic fluxes of the resonant inductor and the primary transformer winding in the common magnetic path partly or completely destructively add up.

In one particular embodiment of the combined transformer according to the invention, the first magnetic circuit and the second magnetic circuit are guided along a core.

In a further embodiment of the combined transformer according to the invention, the first magnetic circuit and the second magnetic circuit are guided at least partly along respective core segments of the core.

The core serves for the targeted spatial guidance of the magnetic flux in the magnetic circuit and usually consists of materials with a high magnetic conductivity, such as ferrite or iron, for example.

The core can consist of a plurality of core segments. In this case, there are at least two parts of the core, through each of which one of the magnetic fluxes flows independently of one another. A core can also have more than two core segments. In one embodiment, the two magnetic fluxes can be guided together on a part of the core, for example in a common limb.

The halves of the core can each be arranged in a circular manner in a circuit end, such as, for example, in the case of an EI core form or else can be embodied as single limbs with possibly open ends.

In a further embodiment of the combined transformer according to the invention, a magnetically active cross section of the core at a location of the magnetic path common to the first part and to the second part is reduced with respect to another location outside of the magnetic path common to the first part and to the second part.

The destructive superposition causes an overall flux that is lower in comparison with destructive superposition not being present. In other words: the magnetic flux is lower at this location due to the destructive superposition than at a location outside of the common path. In order to retain the same magnetic flux density, in the case of a lower magnetic flux, the magnetically active cross section of the material/medium at the location of the common path can be selected to be smaller. In this way, a thinner material/medium and/or a material/medium with a lower cross section at this location is possible than at a location without the destructive superposition. As a result, the volume and the installation space of the combined transformer according to the invention can be reduced.

The cross section of the material/medium orthogonal to the flux direction of the magnetic flux is defined as the magnetically active cross section. Since this magnetic flux usually runs along or approximately parallel to the longitudinal extent of a material/medium of the core, the magnetically active cross section usually corresponds to the cross section of the material/medium.

In order to reduce the required magnetic cross section, the resonant inductor and the primary transformer winding are furthermore interconnected and wound in such a way that the magnetic flux is destructively added on the common path.

The cross section of the material/medium of the core can be reduced in comparison with a cross section of the material/medium of the core at locations that are not situated on the common path of the magnetic circuits. The thickness or the cross section of the core can thus be smaller in the destructively superposed part of the common path than in the regions of the core, for example the core halves, on which the magnetic fluxes are not guided together. In another approach, the magnetically active cross section of the core can be reduced in comparison with the cross section that would be necessary if the magnetic fluxes were not destructively added. If they were added, for example, in a positive manner, the cross section would have to be even larger than at locations through which only one of the two magnetic fluxes flows.

In one particular embodiment of the combined transformer according to the invention, the primary transformer winding and the winding of the resonant inductor are wound onto different limbs of the core. Open limbs make it possible to easily wind the resonant inductor and the primary transformer winding around the core. In the case of closed circuits or cores, the wire for each winding has to be threaded through in a complex manner. If necessary for a specified application, the resonant inductor and the primary transformer winding can each be wound onto rings or half-shells.

In one embodiment according to the invention of the combined transformer, the core is embodied as a PQ or E core. For these cores, there may be matching winding bodies, which permit the prefabrication, the separate assembly of the winding on the core and the connection of the winding, for example to a printed circuit board.

In a further embodiment of the combined transformer according to the invention, the primary transformer winding and the winding of the resonant inductor are wound in one piece. In this way, the winding of the resonant inductor and the primary transformer winding can be wound using a single wire. This winding process is ideally carried out in one working step, which simplifies production. In this case, first of all, a first winding can be wound around a limb, the wire can then be guided to a second limb and the second winding can be wound there using the same apparatus.

In one particular embodiment of the combined transformer according to the invention, there is provision for the combined transformer to be used as an LLC transformer when the resonant inductor is electrically connected to a capacitor. The interconnection with the capacitor can achieve a circuit having a connected resonant circuit.

The invention furthermore comprises an LLC resonant converter having a combined transformer, which comprises a primary transformer winding, which is configured to generate during operation a first magnetic flux, which forms a first magnetic circuit, and has a resonant inductor having a winding, which resonant inductor is configured to generate during operation a second magnetic flux, which forms a second magnetic circuit, wherein the primary transformer winding and the winding of the resonant inductor are arranged with respect to one another in such a way that at least one first part of the first magnetic circuit and at least one second part of the second magnetic circuit run on a magnetic path common to the first part and to the second part.

A previous multi-component-part arrangement of the resonant inductor, the primary transformer winding and the secondary transformer winding of an LLC resonant converter is converted according to the invention to an arrangement in which the transformer with primary and secondary transformer winding additionally comprises the resonant inductor, as a result of which the magnetic resonant component parts of the LLC resonant converter are integrated in a component. What is accomplished in this way is that a resonant LLC resonant converter is provided, which is distinguished by efficiency and simplicity in the implementation while retaining the performance in the context of reducing complexity. Savings in the area of number of component parts, installation space, costs and weight and improved simplicity in terms of design can be achieved using the combined transformer according to the invention for the LLC resonant converter according to the invention.

Exemplary embodiments of the invention are explained in more detail below with reference to the drawings. For better clarity of illustration, the figures do not show a representation that is to scale or in proportion. In the figures, unless stated otherwise, identical reference signs denote identical parts with the same meaning.

In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
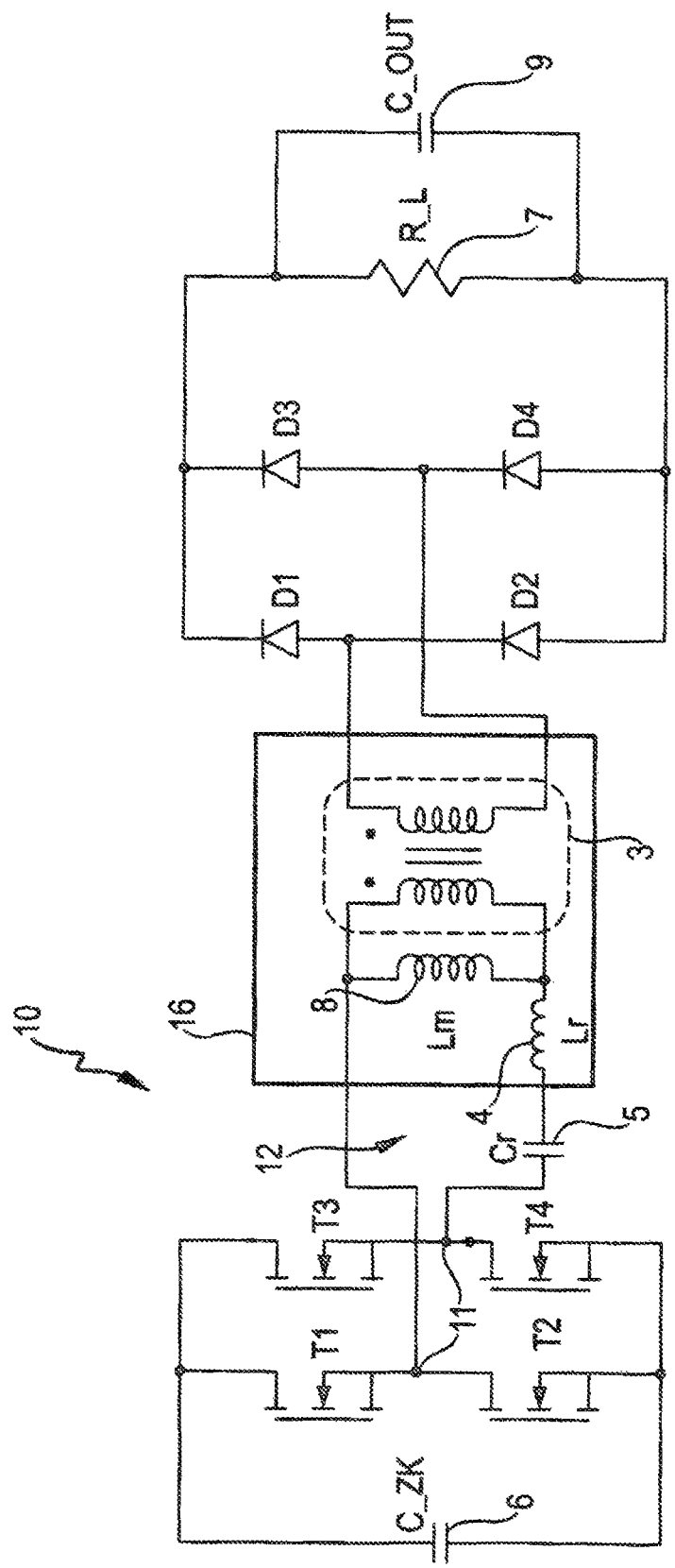
FIG. 1 shows a circuit diagram of an LLC resonant converter according to the invention with an electrical equivalent circuit diagram of the combined transformer according to the invention.

FIG. 1 shows a circuit diagram of an LLC resonant converter 10 according to the invention with integration of a resonant inductor 4 having a resonant inductance value Lr and of a transformer having a magnetizing inductance value Lm in a component, the combined transformer 16 according to the invention. The real combined transformer 16 comprises an ideal transformer 3, which is connected in parallel with a main inductance 8 of the combined transformer 16 having the magnetizing inductance value Lm.

The resonant LLC resonant converter 10 illustrated in FIG. 1 has a so-called LLC topology, which comprises a resonant network consisting of the resonant inductor 4, the main inductance 8 of the transformer having the magnetizing inductance value Lm and a resonant capacitor 5 having resonant capacitance Cr. The primary side of the resonant capacitor 5 is connected to the combined transformer 16 according to the invention, which comprises in integrated fashion a core, the winding of the resonant inductor 4, the primary winding and a secondary winding of the transformer, with the result that the resonant inductor 4, the main inductance 8 and the resonant capacitor 5 form a resonant circuit 12. The combined transformer 16 is incorporated in the resonant circuit 12 as an LLC transformer.

Switching transistors T1-T4 of a transistor full-bridge can be used to switch over the entire load range under zero voltage or virtually zero voltage (zero-voltage switching), as a result of which energy-efficient operation with high efficiencies can be achieved. The LLC resonant converter 10 according to the invention furthermore has a high power density.

The circuit shown also includes an input intermediate circuit capacitor 6 having the capacitance C_ZK, which supplies the circuit with the DC voltage that is to be converted. This voltage is applied to the input side of the transistor full-bridge comprising the switching transistors T1-T4.

A bridge voltage 11, which is applied to the output side of the switching transistors T1-T4, is an input voltage in the resonant circuit 12, which comprises the resonant capacitor 5, the resonant inductor 4 and the main inductance 8. The input voltage to the resonant circuit 12 causes a current intensity in the resonant circuit 12. The current governed by resonance flows via the switching transistors T1-T4. Depending on the current direction, two of the switching transistors T1, T2 or T3, T4 thus form a passage for the resonant current. Switching advantageously occurs whenever the voltage difference over the switching transistors T1-T4 goes to zero (zero-voltage switching).

The secondary side of the transformer 16 combined with the resonant inductor 4 is connected to an output rectifier, which comprises rectifier diodes D1-D4. A transformed DC voltage is applied at the output of the rectifier, said DC voltage being output in FIG. 1 for illustration of the load to an equivalent load, illustrated by a resistor 7 having a resistance value R_L connected in parallel with an output capacitor 9 having an output capacitor capacitance C_OUT.

Figure 2A:
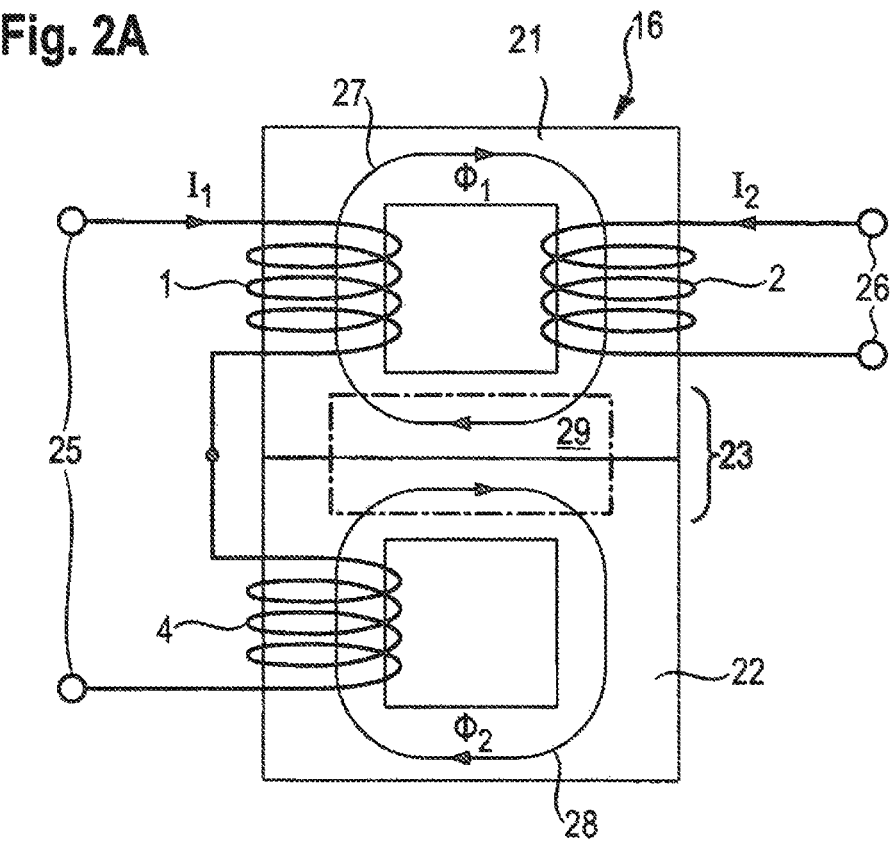
FIG. 2A shows a magnetic equivalent circuit diagram of the combined transformer according to the invention shown in FIG. 1.

FIG. 2A shows a magnetic equivalent circuit diagram of the combined transformer 16 according to the invention shown in FIG. 1. A primary-side transformer winding 1 and a secondary-side transformer winding 2 are wound on a magnetic core 21. A winding of the resonant inductor 4 is wound on a magnetic core 22 of the resonant inductor 4. In another embodiment, the magnetic core 21 and the magnetic core 22 of the resonant inductor 4 can be formed together in one piece or respectively in multiple pieces. The resonant inductor 4 and the primary transformer winding 1 are connected in series and the primary side thereof is connected to electrical terminals 25 to which, during operation, the bridge voltage 11 is applied when a current I1 flows through the primary-side transformer winding 1 and the resonant inductor 4. The secondary side of the secondary-side transformer winding 2 is connected to electrical terminals 26 at which, during operation, an output voltage is dropped when a further current I2 flows through the secondary-side transformer winding 2, said output voltage forming an input voltage for the output rectifier having the rectifier diodes D1-D4 (see FIG. 1).

During operation, the primary-side transformer winding 1 generates a magnetic flux, which forms a first magnetic circuit 27 (transformer circuit) of a transformer, which is formed from the primary-side transformer winding 1, the magnetic core 21 and the secondary-side transformer winding 2. During operation, the winding of the resonant coil 4 generates a further magnetic flux, which forms a second magnetic circuit 28 (resonant circuit) of the resonant inductor 4.

A point and a positive sign (not illustrated) at the primary-side transformer winding 1 and the winding of the resonant coil 4 determine whether, when the winding of the resonant inductor 4 and the primary-side transformer winding 1 pass through from the point, a core segment 23, which comprises a part of the magnetic core 21 and of the magnetic core 22 of the resonant inductor 4, is encircled in the same direction by the magnetic flux generated by the primary transformer winding and the further magnetic flux generated by the resonant inductor 4. Two windings can therefore be wound in the same direction or in different directions in relation to one another. The magnetic flux generated by the primary transformer winding and the further magnetic flux generated by the winding of the resonant inductor 4 are superposed on a common magnetic path 29 in the core segment 23, which can completely or partly comprise a central web segment of the cores 21 and 22 joined to one another and combined with one another. Like the core segment 23, the magnetic path 29 can completely or partly comprise the central web segment of the cores 21 and 22 combined with one another.

In order to reduce a required magnetic cross section of the core segment 23 common to the magnetic fluxes of the winding of the resonant inductor 4 and the primary transformer winding 1, the resonant inductor 4 and the primary transformer winding 1 are interconnected and/or wound in such a way that the respectively arising magnetic fluxes are added at least partly destructively on the common magnetic path 29.

Figure 2B:
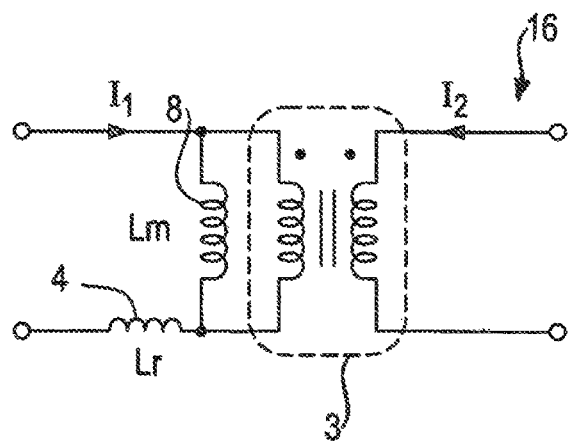
FIG. 2B shows the electrical equivalent circuit diagram of the combined transformer according to the invention from FIG. 1.

FIG. 2B shows the electrical equivalent circuit diagram of the combined transformer 16 according to the invention from FIG. 1. Equivalent to FIG. 2A, the primary-side series circuit composed of the resonant inductor 4 having the resonant inductance value Lr and a primary side of the combined transformer 16, which is illustrated as the magnetizing inductance value Lm and the ideal transformer 3, can be seen. When the current I1 flows through the primary-side transformer winding 1 and the resonant inductor 4, a magnetic flux is induced in the magnetic core 21 by the primary-side transformer winding 1, said magnetic flux inducing a voltage in the secondary-side transformer winding 2 according to the law of induction, said voltage leading to the further current I2 through the secondary-side transformer winding 2.

Figure 3:
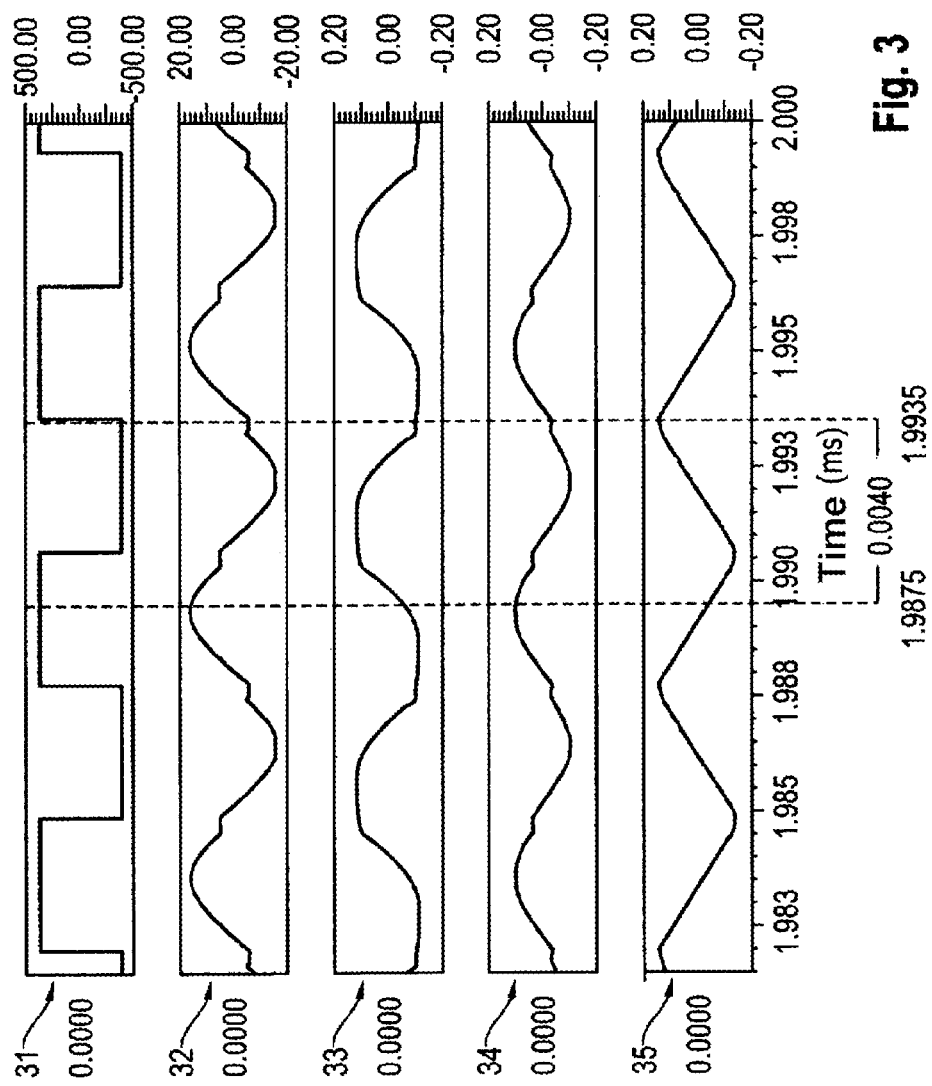
FIG. 3 shows simulation results of the LLC resonant converter having the LLC transformer according to the invention.

FIG. 3 shows simulation results of the LLC resonant converter having a circuit according to FIG. 1 having the LLC transformer according to the invention, which, in addition to the primary and secondary transformer windings 1 and 2, also comprises the winding of the resonant inductor 4, in a temporally dependent manner. The simulation values illustrated originate from a bridge voltage 31, a current intensity 32 in the resonant circuit 12, a core actuation 33 of the common magnetic path 29, a core actuation 34 of the path having the resonant inductor 4 or the resonant circuit 28, and a core actuation 35 of the path of the transformer circuit 27.

The simulated bridge voltage 31 would in this case predict the bridge voltage 11, the simulated current intensity 32 in the resonant circuit 12 the current I1 of the resonant circuit 12.

The simulation curve 33 of the common magnetic path 29 is a superposition from the simulation curves 34, 35 of the resonant circuit 28 and the transformer circuit 27.

Figure 4:
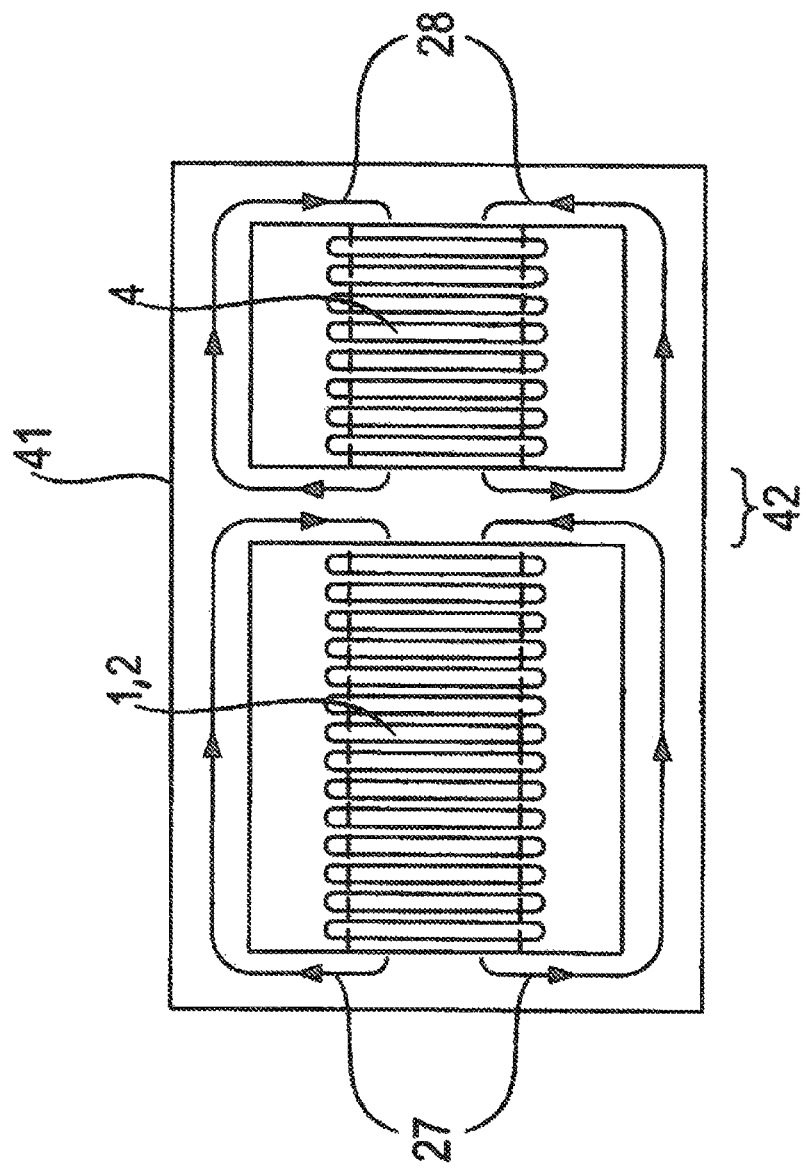
FIG. 4 shows a design of the primary transformer winding and the winding of the resonant inductor on a common core of the combined transformer according to the invention.

FIG. 4 shows the combined transformer according to the invention in a further embodiment, in which a common core 41 bears the transformer windings 1 and 2 and the winding of the resonant inductor 4 arranged longitudinally one behind the other on a respective limb. The axes of symmetry of the primary transformer winding 1 and the resonant inductor 4 therefore form (approximately) a straight line. A circular segment or an oval section is likewise possible. The primary transformer winding 1 and the resonant inductor 4 are wound and have current flowing through them in such a way that magnetic flux directions are formed in such a way that the magnetic circuits 27, 28 formed by the magnetic fluxes are destructively superposed at one location.

In the arrangement shown, the primary transformer winding 1 and the winding of the resonant inductor 4 are arranged one behind the other and in each case form a magnetic flux in the same direction. The flux of the magnetic circuit 27 arriving in the transformer winding 1 is superposed with the magnetic flux of the circuit 28 of the resonant inductor 4. In this case, the magnetic fluxes of the primary transformer winding 1 and the resonant inductor 4 are subtracted completely or partly at the part 17 of the core 41.

This subtraction takes place at a central web 42, over which the common magnetic path 29 runs. The central web 42 is part of the core 41. Proceeding from this central web 42, the two magnetic fluxes propagate along their respective magnetic circuits 27, 28 into the respective half-shells of the core 41.

In this arrangement, the web width of the central web 42 can be thinner than in the case in which the two magnetic circuits 27, 28 are not destructively superposed. The reduced web width reduces the overall size of the combined transformer 16 and the LLC resonant converter 10 in which the combined transformer 16 is installed.

The features of the invention described with reference to the illustrated embodiments, such as, for example, the arrangement of the primary transformer winding 1 and the resonant inductor 4 longitudinally one behind the other on a respective limb of the common core 41 with axes of symmetry of the primary transformer winding 1 and the resonant inductor 4, which form (approximately) a straight line, can also be present in other embodiments of the invention, such as, for example, the arrangement of the primary transformer winding 1 and the resonant inductor 4 longitudinally one behind the other on a respective limb of the common core 41 with axes of symmetry of the primary transformer winding 1 and the resonant inductor 4, which form (approximately) a circular segment or oval section, apart from if it is stated otherwise or it is impermissible for technical reasons.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined transformer for an LLC resonant converter comprising:
   a primary transformer winding configured to generate during operation a first magnetic flux, which forms a first magnetic circuit, and
   a resonant inductor having a winding, wherein the resonant inductor is configured to generate during operation a second magnetic flux, which forms a second magnetic circuit,
   wherein the primary transformer winding and the winding of the resonant inductor are arranged with respect to one another such that a common magnetic circuit is formed by the first and second magnetic circuits, the common magnetic circuit including at least one first part of the first magnetic circuit and at least one second part of the second magnetic circuit, each superposed on the common magnetic circuit, and
   wherein the first magnetic circuit and the second magnetic circuit are guided along a core and the first magnetic circuit and the second magnetic circuit are guided at least partly on respectively different segments of the core, which segments are physically connected along a join that separates the first magnetic circuit from the second magnetic circuit in a region of the common magnetic circuit.

2. The combined transformer as claimed in claim 1, wherein the primary transformer winding and the winding of the resonant inductor are arranged with respect to one another such that the first magnetic flux of the first magnetic circuit and the second magnetic flux of the second magnetic circuit are at least partly destructively superposed on the common magnetic circuit to the first part and to the second part.

3. The combined transformer as claimed in claim 2, wherein the destructive superposition is caused by at least one of an arrangement, winding direction and interconnection of the primary transformer winding and the resonant inductor.

4. The combined transformer as claimed in claim 3, wherein the first magnetic circuit and the second magnetic circuit are guided along a core and the first magnetic circuit and the second magnetic circuit are guided at least partly on respectively different segments of the core.

5. The combined transformer as claimed in claim 4, wherein a magnetically active cross section of the core at a location of the common magnetic circuit to the first part and to the second part is reduced with respect to another location outside of the common magnetic circuit to the first part and to the second part.

6. The combined transformer as claimed in claim 3, wherein the primary transformer winding and the winding of the resonant inductor are wound in one piece.

7. The combined transformer as claimed in claim 2, wherein the first magnetic circuit and the second magnetic circuit are guided along a core and the first magnetic circuit and the second magnetic circuit are guided at least partly on respectively different segments of the core.

8. The combined transformer as claimed in claim 7, wherein a magnetically active cross section of the core at a location of the common magnetic circuit to the first part and to the second part is reduced with respect to another location outside of the common magnetic circuit to the first part and to the second part.

9. The combined transformer as claimed in claim 2, wherein the primary transformer winding and the winding of the resonant inductor are wound in one piece.

10. The combined transformer as claimed in claim 1, wherein a magnetically active cross section of the core at a location of the common magnetic circuit to the first part and to the second part is reduced with respect to another location outside of the common magnetic circuit to the first part and to the second part.

11. The combined transformer as claimed in claim 10, wherein the primary transformer winding and the winding of the resonant inductor are wound onto different limbs of the core.

12. The combined transformer as claimed in claim 1, wherein the primary transformer winding and the winding of the resonant inductor are wound onto different limbs of the core.

13. The combined transformer as claimed in claim 1, wherein the core is embodied as a PQ or E core.

14. The combined transformer as claimed in claim 1, wherein the primary transformer winding and the winding of the resonant inductor are wound in one piece.

15. The combined transformer as claimed in claim 1, wherein the combined transformer is configured to be used as an LLC transformer when the resonant inductor is electrically connected to a capacitor.

16. An LLC resonant converter having a combined transformer, the combined transformer comprising:
   a primary transformer winding configured to generate during operation a first magnetic flux, which forms a first magnetic circuit, and
   a resonant inductor having a winding, wherein the resonant inductor is configured to generate during operation a second magnetic flux, which forms a second magnetic circuit,
   wherein the primary transformer winding and the winding of the resonant inductor are arranged with respect to one another such that a common magnetic circuit is formed by the first and second magnetic circuits, the common magnetic circuit including at least one first part of the first magnetic circuit and at least one second part of the second magnetic, each superposed on the common magnetic circuit, and
   wherein the first magnetic circuit and the second magnetic circuit are guided along a core and the first magnetic circuit and the second magnetic circuit are guided at least partly on respectively different segments of the core, which segments are physically connected along a join that separates the first magnetic circuit from the second magnetic circuit in a region of the common magnetic circuit.

* * * * *